Jan. 22, 1935.  W. L. AVERY  1,988,888
BRAKE MECHANISM AND CLUTCH
Filed March 15, 1934   4 Sheets-Sheet 1

W. L. Avery
INVENTOR
By: Marks & Clerk
ATTYS.

Jan. 22, 1935.　　　W. L. AVERY　　　1,988,888
BRAKE MECHANISM AND CLUTCH
Filed March 15, 1934　　4 Sheets-Sheet 3

W. L. Avery
INVENTOR

By: Marks & Clerk
Att'ys.

Jan. 22, 1935.  W. L. AVERY  1,988,888
BRAKE MECHANISM AND CLUTCH
Filed March 15, 1934  4 Sheets-Sheet 4

W. L. Avery
INVENTOR

By: Marks & Clerk
Attys.

Patented Jan. 22, 1935

1,988,888

UNITED STATES PATENT OFFICE

1,988,888

BRAKE MECHANISM AND CLUTCH

William Leicester Avery, Thorley, Bishop's Stortford, England

Application March 15, 1934, Serial No. 715,764 In Great Britain March 8, 1933

8 Claims. (Cl. 188—72)

This invention relates to brakes of the kind comprising flexible brake discs adapted to be applied through the actuation of a fluid capsule. The invention may also be extended for application to clutches of a similar construction.

In connection with brakes of this kind as applied especially to aircraft, where control is effected from a cockpit several feet above the wheels to be braked, it may be found that the pressure due to the head of the operating fluid is sufficient to overcome the natural resiliency of the brake discs and cause engagement of the braking surfaces.

It is the object of the invention to devise certain improvements in brakes of this kind which ensure the separation of the braking surfaces when it is required that the brake should be inoperative.

According to the present invention brake mechanism of the above kind is provided wherein the flexible brake discs are dished so as to increase their resistance to distortion.

The invention also extends to a method of mounting the brake discs in a brake mechanism of the above kind which consists in mounting the brake discs so that in their normally inoperative positions they will be held under tension or be permanently stressed.

The invention also provides brake mechanism of the above kind wherein means is provided for centring or positioning the brake discs relatively to their co-operating braking surfaces.

Further features of the invention will be hereinafter described or indicated.

In the accompanying drawings:—

Figures 1, 2:
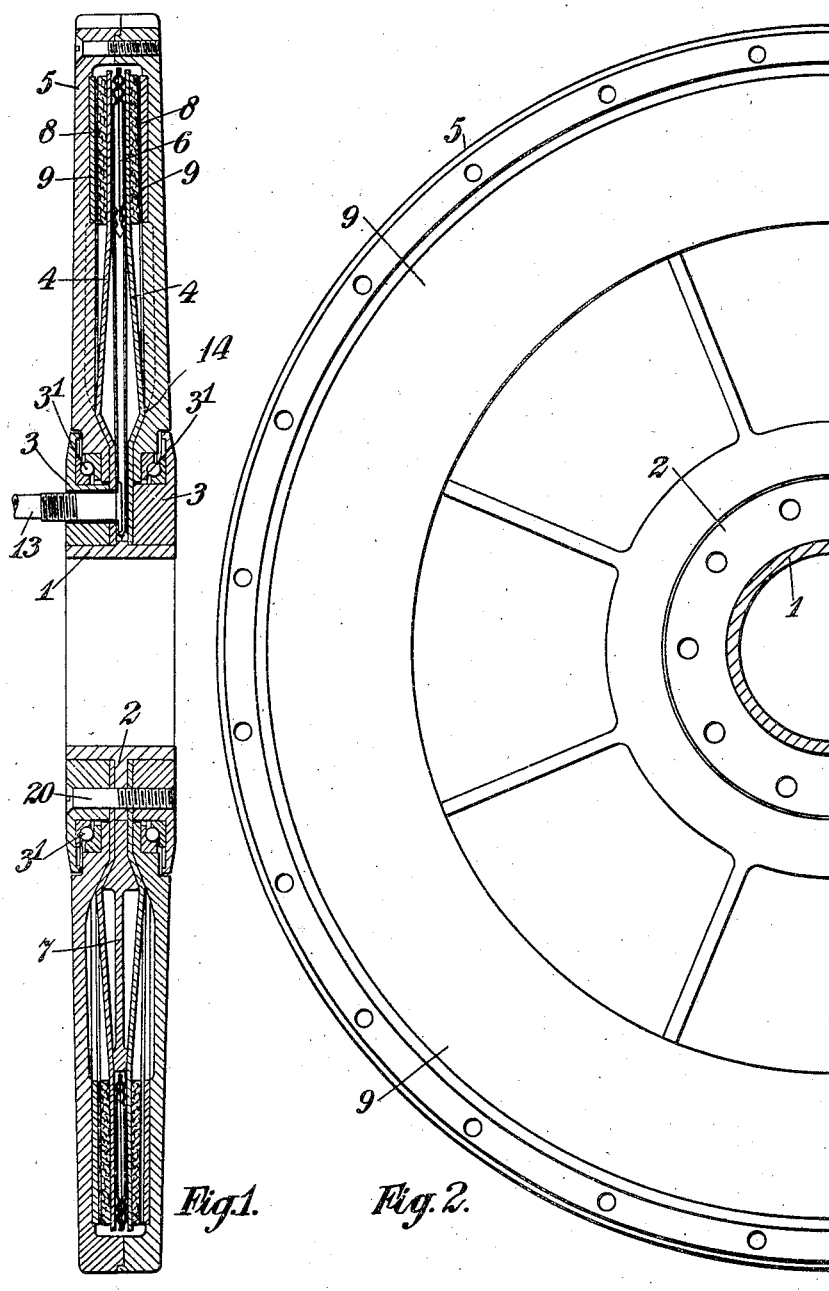
Figure 1 is a cross sectional elevation of a brake according to the invention.
Figure 2 is a side elevation of one half of the brake shown in Figure 1 looking upon the inside of the brake casing, the brake discs and fluid capsule being removed.

In carrying the invention into effect in one convenient manner as for example in its application to braking mechanism for the landing wheels of an aeroplane and as illustrated in the drawings the improved brake comprises a central hub 1 adapted to be secured to some fixed structure and formed with a centrally disposed radially projecting annular flange 2 on each side of which there is mounted an annular ring 3 which is adapted to clamp a flexible annular disc 4 against the corresponding side face of the flange 2 by clamping bolts 20. The ring 3 is adapted to accommodate suitable bearing members 3' upon which a casing 5 is rotatably mounted, said casing being secured to a landing wheel (not shown) of the aeroplane and being formed so as completely to enclose the flexible discs 4 and also an annular fluid capsule 6. In some cases the casing may also house a frame 7 disposed between the brake discs 4 and which serves to centre these discs so that annular brake surfaces 8 provided on the outer walls thereof in the unapplied condition of the brakes, tend always to be maintained at the same distances apart from corresponding brake surfaces 9 provided upon the adjacent inner walls of the casing. The centering frame 7 (which is seen separately in Figures 4 and 5) conveniently consists of a series of equally spaced arms 10 which may be of web construction and extend radially from a central hub 11 which may take the place of the hub 1 previously described. The flexible brake discs 4 are adapted to be pressed into contact with their corresponding brake surfaces 9 on the casing, for the purpose of applying a braking effort, by the fluid capsule 6 which is a chamber with flexible walls which is formed with an inwardly projecting radial extension 12 (Figure 3) which communicates with the interior of the annular part of the capsule and with a pressure fluid supply pipe 13 (Figure 1), the central flange of the hub 1 or 11 being cut away, as shown at 15 in Figure 5, to accommodate the end of the said capsule extension and the inlet pipe passing through one of the said rings 3 into the extension 12. The annular portion of the capsule is preferably formed so that its side walls will, on the application of fluid pressure to the interior of the capsule, expand and move substantially parallel with the corresponding side walls of the flexible discs against which the capsule walls press, the arrangement ensuring that there is a relatively large area of contact between the capsule walls and the said discs, which relationship remains substantially the same as the capsule expands and dilates.

It is desirable, on account of light weight requirements, to keep the discs 4 as thin as possible and in order to increase the resistance of the thin brake discs 4 to distortion by the capsule 6 they are, towards the centres thereof and in the example of the invention illustrated in Figure 1, dished or bowed outwardly, as indicated at 14, so as to stiffen the discs to such an extent that while they are capable of yielding to cause application of the brake, upon an intentional braking effort being applied, they will normally be maintained out of action notwithstanding the pressure maintained in the capsule owing to the head of fluid above the brake. The centering frame 7, when employed in a brake construction according to Figure 1, is, conveniently, shaped, in the appropriate position, to correspond with the dished shape of the discs while the neighboring portion of the casing may be correspondingly shaped.

Figures 3, 6:
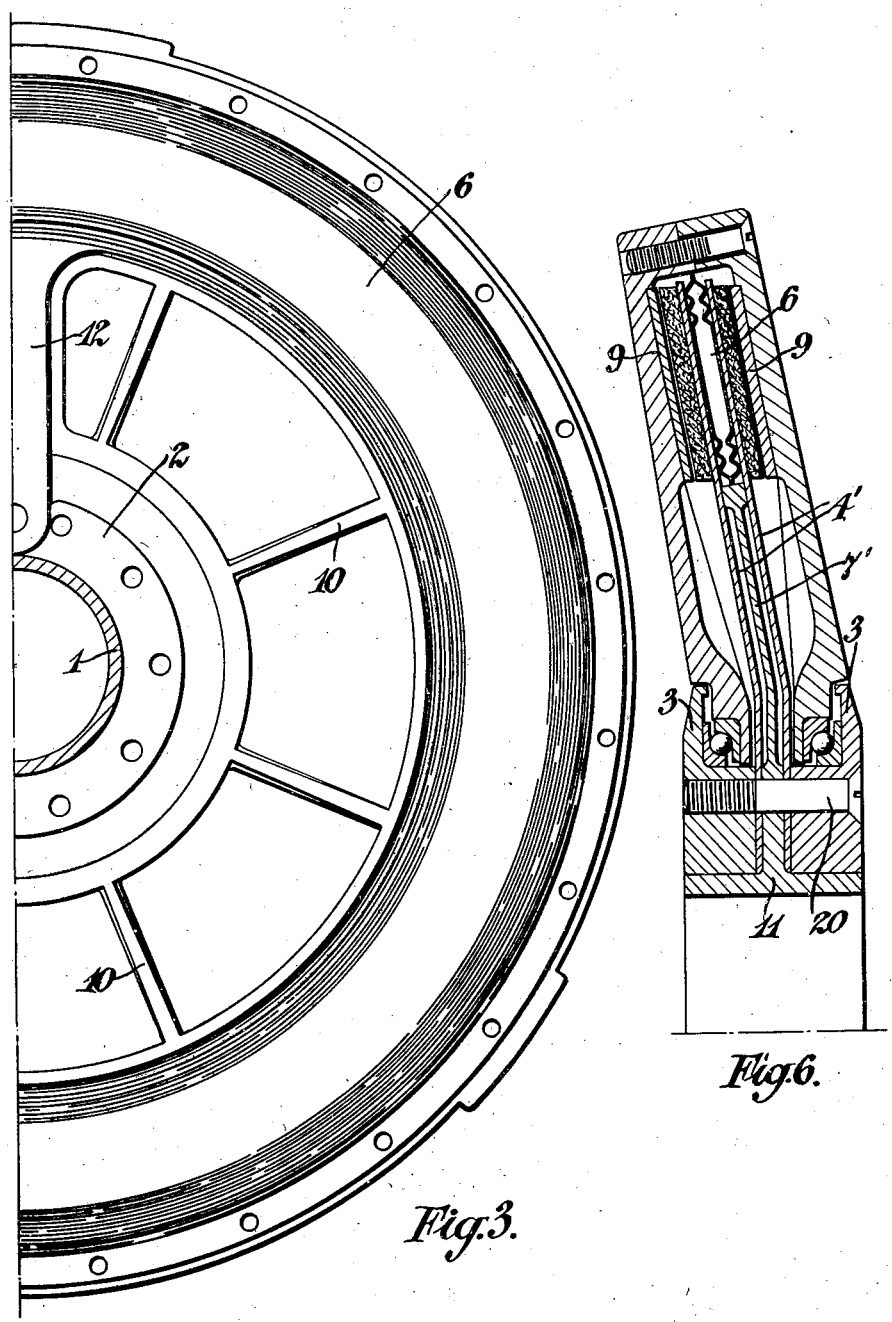
Figure 3 is a similar view to Figure 2 but showing the fluid capsule and one of the brake discs.
Figure 6 is a cross sectional elevation showing one half of a modified form of brake according to the invention wherein the brake casing and operative parts are of stream-line formation.
Figures 4, 5:
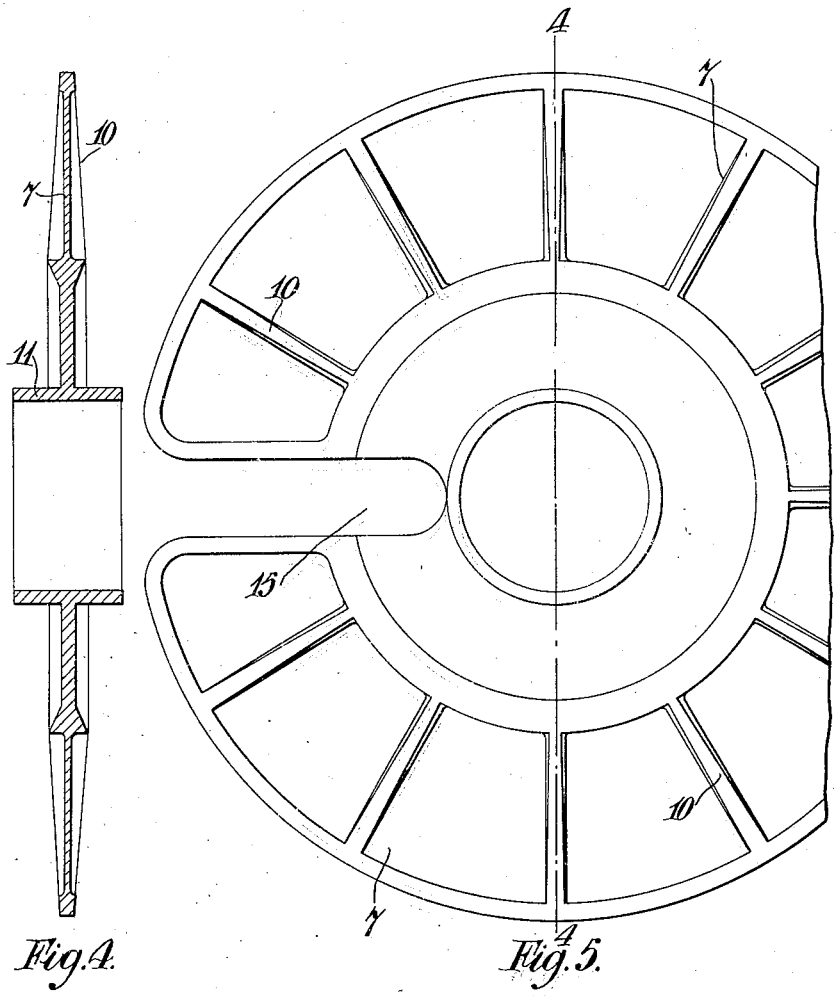
Figure 4 is a cross sectional elevation of the centring frame which also forms a part of the invention, the section being taken on the line 4—4 of Figure 5.
Figure 5 is a side elevation of Figure 4.
Figures 7, 8, 9:
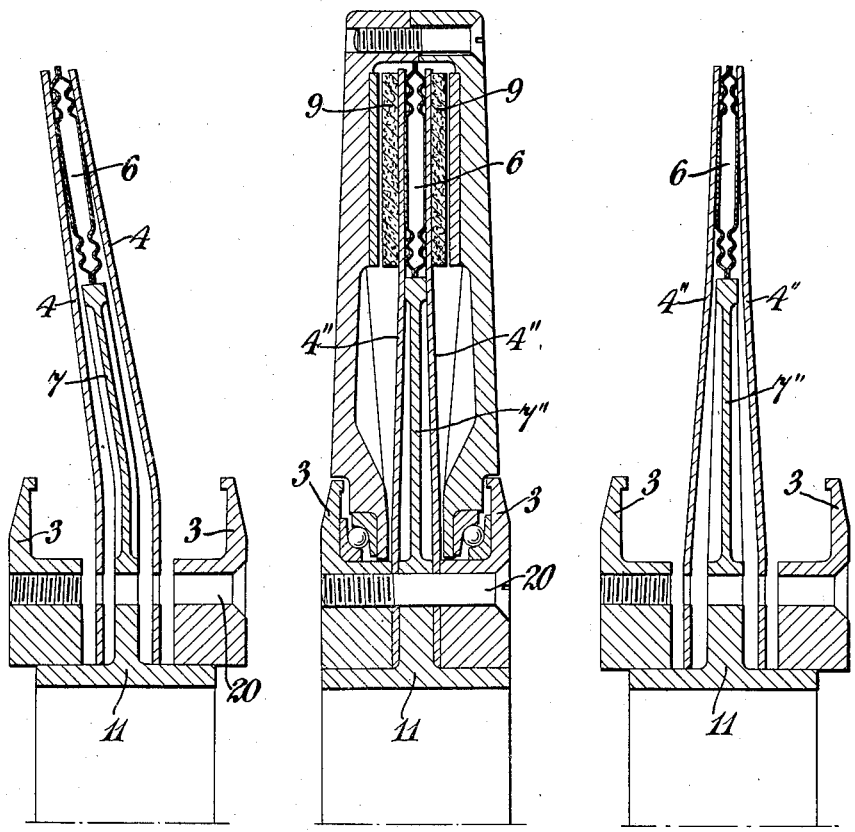
Figure 7 is a similar view to Figure 6 but with the brake casing removed and showing the relative positions of the brake discs and centering frame before the securing rings are tightened.
Figures 8 and 9 are similar views to Figures 6 and 7 illustrating the method of securing the brake discs of a brake mechanism similar to Figure 1 and wherein there is no stream-lining carried out.

In the modification of the invention according to Figures 6 and 7 the brake discs 4' and associated parts, that is, the casing, fluid capsule and centering frame, are shaped to conform, for example, with the stream-line shape of a wheel to which the brake is applied. In such case the brake discs 4' are dished in the same direction and the dishing of the brake discs is carried out to a different degree for each disc so that, prior to the rings 3 being tightened, for the purpose of securing the discs upon the hub 11, the inner portions of the discs will be spaced from the adjacent surfaces of the centering frame, as shown in Figure 7, so that upon tightening the rings 3 these inner portions of the discs will be moved into contact with the said surfaces of the centering frame and in doing so the outer portions of the discs 4', which previously rested against the sides of the fluid capsule, will be moved away from the latter so that, when securely fixed in position by the rings 3, the discs 4' will assume the position shown in Figure 6 in which they are held under tension and are permanently stressed.

This is true because the flexible discs are dished and the central portions are more widely separated than the peripheral portions when they are placed in juxtaposition as applicant has placed them. It will be noted that frame 7 has a thickened line and when the dished portions of the discs come into contact with said indicated line a sort of pivot is formed so that as the central portions of the discs approach each other, the outer portions are forced away from each other with an evident stress toward each other.

A similar method of mounting the brake discs is illustrated in Figures 8 and 9 but in this instance the brake discs are dished inwardly to the same, or substantially the same, degree but in such manner that movement of the inner portions of the brake discs inwardly and of the outer portions thereof outwardly may take place upon the rings 3 being tightened in order to produce a permanent stress condition in the brake discs as and for the purpose already described.

It is to be understood that the invention is not limited to the above details but is capable of modification to meet any particular requirements or practical conditions it may be desired to fulfil.

Having now described my invention, what I claim as new and desire to secure by Letters Patent is:—

1. A brake comprising in combination a casing, a pair of flexible discs of dished formation means for holding said discs within the casing under continual tension tending to bring the discs together and a fluid capsule for moving the discs against said tension into braking engagement with the casing.

2. A brake comprising in combination a rotatable casing, a pair of flexible discs, means for holding said discs non-rotatably within the casing under continual tension tending to bring said discs together and means for moving the discs into braking engagement with the casing.

3. A brake comprising in combination a rotatable casing, a pair of flexible discs of dished formation means for holding said discs non-rotatably within the casing in a continually stressed condition, the discs being differentially dished in the opposite sense, and means for moving the discs in a direction opposite to said stress into braking engagement with the casing.

4. A brake comprising in combination a non-rotatable hub, a casing rotatably mounted upon the hub and having brake surfaces on its interior surfaces, a pair of disc members of flexible material fixed at their centres upon the hub, means between the discs and intermediate the center and the periphery of the discs for holding the discs apart to give the outer portions of the discs a bias toward each other and a fluid capsule disposed within the space between the said disc members so that the discs are permanently stressed and are unrestrained at their peripheries, the said discs carrying brake surfaces on their peripheries for engagement with the brake surfaces on the casing, and a fluid capsule disposed within the casing between the brake discs, the capsule operating to move the brake discs into braking engagement with the casing on account of the walls of the capsule exerting pressure against the brake discs when the capsule is expanded by fluid pressure.

5. A brake comprising in combination a rotatable casing, a pair of flexible discs non-rotatably mounted within the casing so as to be movable into and out of braking engagement with the casing and a centering frame for the discs, said frame being disposed between the discs and serving to maintain the discs at the same distances apart from the casing in their non-braking positions.

6. A brake comprising in combination a rotatable casing, a pair of flexible dished discs non-rotatably held within the casing under tension so as to be movable into and out of braking engagement with the casing and a centering frame for the discs, said frame being disposed between the discs and serving to maintain the discs at the same distances apart from the casing in their non-braking positions.

7. A brake comprising in combination a rotatable casing, a pair of flexible concavo-convex discs differing in curvature the one from the other non-rotatably mounted within the casing with the convex surfaces facing the same direction, means for holding the discs apart intermediate the center and the periphery to give the outer portions of the discs a bias toward each other, the discs being held to a stationary part at their centres and being unrestrained at their peripheries, and a fluid capsule disposed between the discs.

8. A brake comprising in combination a stationary hub, a casing rotatably mounted upon the hub, a pair of annular flexible dished discs fixed at their centres to the hub and having their peripheries unrestrained, means for holding the discs in a continually stressed condition, and a fluid capsule for moving the discs into braking engagement with the casing.

WILLIAM LEICESTER AVERY.